United States Patent [19]
Miller et al.

[11] Patent Number: 5,702,038
[45] Date of Patent: Dec. 30, 1997

[54] ORGANIZER BAG FOR STROLLERS

[76] Inventors: Judith A. Miller; Christopher J. Miller, both of 619 Kitlou Ct., Holland, Ohio 43528

[21] Appl. No.: 631,740

[22] Filed: Apr. 10, 1996

[51] Int. Cl.⁶ .................................................. B62B 9/26
[52] U.S. Cl. .......................... 224/409; 150/108; 383/22
[58] Field of Search .............................. 224/409, 411, 224/401; 383/22, 25; 150/108, 110

[56] References Cited

U.S. PATENT DOCUMENTS

| | | |
|---|---|---|
| 4,186,859 | 2/1980 | Frankfort et al. ............... 224/409 |
| 5,062,557 | 11/1991 | Mahvi et al. ..................... 224/153 |

OTHER PUBLICATIONS

Journal of American Medical Association, Author—Maurice Gershman, Title—Self-Adhering Nylon tapes, Oct. 1958.

*Primary Examiner*—Henry J. Recla
*Assistant Examiner*—Charles R. Eloshway
*Attorney, Agent, or Firm*—MacMillan, Sobanski & Todd

[57] ABSTRACT

A stroller organizer bag for containing articles such as diapers, tissues and disposal bags has an elongated strap with each of the ends of the strap secured to the bag. The strap has two closure attachments, such as two pairs of snaps, to form a loop in each end of the strap for securing the strap to the stroller handle. The snaps can readily and easily be closed or snapped together around the horizontal bar to form the loops.

19 Claims, 4 Drawing Sheets

ORGANIZER BAG FOR STROLLERS

BACKGROUND OF THE INVENTION

This invention relates in general to bags, totes or packs which are used to carry various articles. More particularly, this invention pertains to containers or bags particularly adapted to carry items associated with babies or toddlers.

Containers or bags for carrying baby or toddler accessories, such as diapers, tissues, and disposal bags, are commonly used to provide the articles needed for babies or toddlers when traveling away from the home. Such bags, usually referred to as diaper bags, typically also include such items as baby toys, baby bottles and a blanket. Diaper bags often provide organizational convenience for baby articles with various pockets and pouches, some of which are secured with zippers, snaps or other fasteners.

Bags or containers such as organizers or diaper bags come in various sizes and shapes, and invariably add to their carrying convenience by having a strap securely connected to the top or sides of the diaper bag. The strap can be generally short, like a handle, for carrying the bag while holding the strap by the hand. Alternatively, the strap can be longer, so that the strap can be looped over the shoulder while holding the diaper bag under the arm. Some designs include adjustable straps using a slidable buckle to enable the user to change the length of the strap as desired.

Another commonly used baby and toddler accessory is the stroller, which enables the child to be wheeled about from place to place without requiring the child to be carded. Strollers have a frame, wheels and seat, and have a handle for pushing and steering by the adult. Nearly all strollers are collapsible so that they can be easily folded for storage or transport in an automobile or airplane luggage compartment. Strollers are of two general types, the rigid seat, forward collapsible type, and the flexible seat, side-to-side collapsible type. The rigid seat type stroller typically has a single piece handle in the shape of a squared U, and the flexible seat stroller usually has separate left and right handles, each being curved in a manner similar to an umbrella handle, thereby giving the flexible seat stroller the name "umbrella stroller".

It can be appreciated that when babies and toddlers are being transported in strollers there is a need to secure diaper bags and similar organizer bags to the stroller. Merely throwing the handle of the bag over the handle or handles of the stroller is not entirely adequate. It would be advantageous if there could be developed improved means for securing diaper bags or other organizers to strollers.

SUMMARY OF THE INVENTION

There has now been developed an organizer bag, such as a diaper bag, for containing articles, such as baby articles, where the bag is capable of being secured to the handle of a baby stroller. For purposes of this specification, the term "baby articles" includes any one or more of the following items: diapers, tissues, disposal bags, baby toys, toddler toys, baby bottles and a blanket. The bag has an elongated strap secured at each of its ends to the bag, and the bag has a closure attachment to form a loop in the strap for securing the strap to the stroller handle. The strap is sufficient for carrying the bag either by hand or on the shoulder. Preferably, two closure attachments are used, each being a pair of mated snaps for forming a loop. When the snaps are secured together around the handle, the loop holds the bag on the stroller.

In a preferred embodiment of the invention, the pair of mated snaps includes a first snap and a second snap spaced apart from each other by a distance within the range of from about 2 to about 12 inches. The first snap is preferably positioned on the strap close to the point of attachment of the strap to the bag so that the loop formed by the snap will be close to the bag, such as within the range of from about one-half to about 6 inches from the bag.

Preferably there is a closure attachment at each end of the strap so that a loop can be formed at each end of the strap. Alternative closure attachments include Velcro patches and a hook and ring attachment for forming the loop.

The invention also contemplates the combination of a bag of the invention for containing articles and a stroller having a frame, a seat, wheels and a handle, with the loops in the strap of the bag securing the bag to the handle of the stroller.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
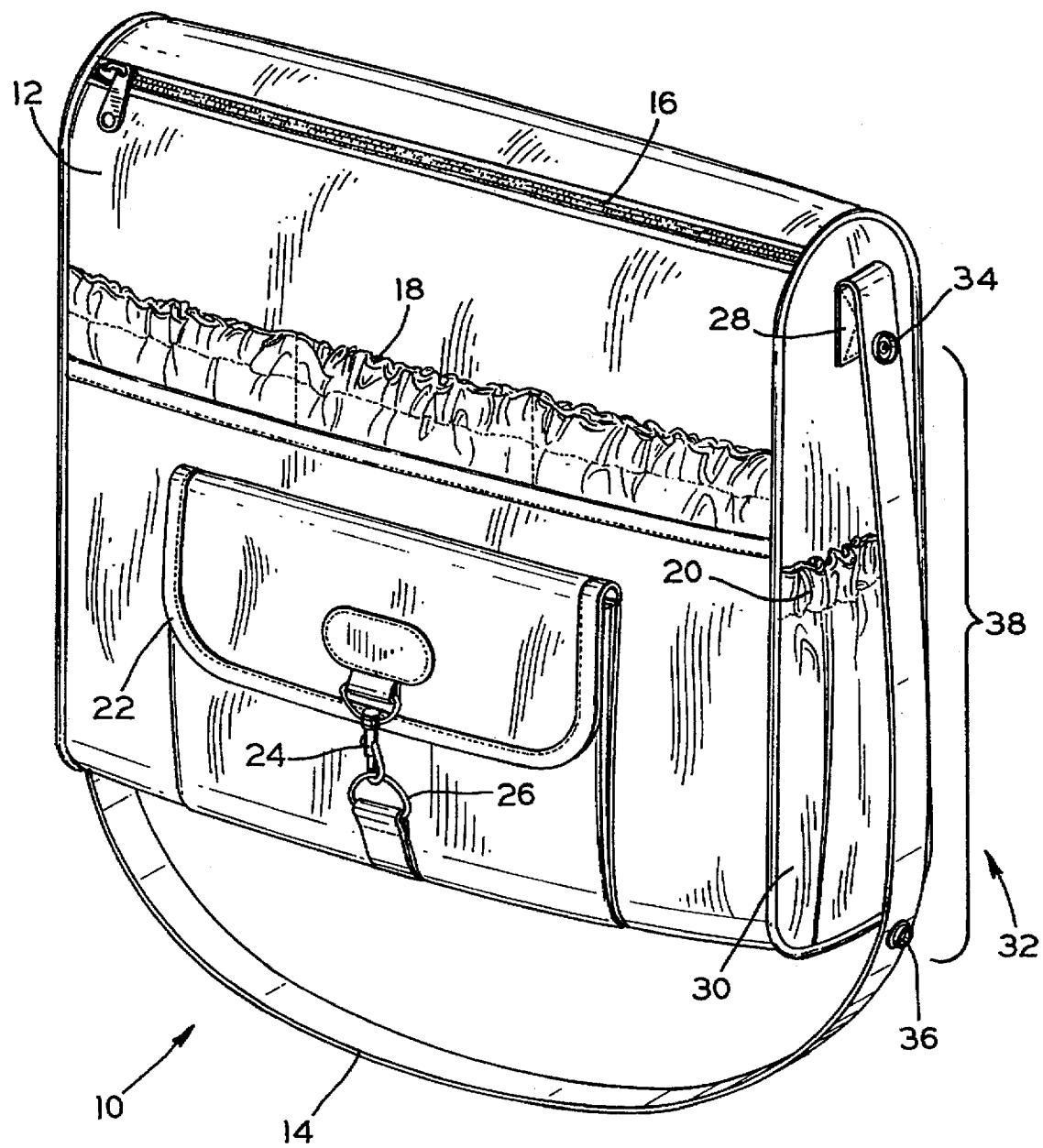
FIG. 1 is a schematic view in perspective of a stroller organizer for containing articles according to the invention.

Referring now to the drawings, there is illustrated in FIG. 1 the stroller organizer of the invention, indicated generally at 10. The stroller organizer is generally comprised of a main compartment 12 and a strap 14. The main compartment can be provided with any convenient closure means, such as a zipper 16. For added convenience and utility in storing and carrying articles, the organizer 10 can be provided with various additional compartments such as main pouch 18, side pouch 20, and pocket 22 which is secured with a hook 24 and ring 26 fastener. The pockets, pouches and compartments can be fastened by any suitable means. Bags such as the stroller organizer 10 can be used for carrying baby or toddler articles, such as diapers, tissues, disposal bags and other similar articles, not shown. The stroller organizer can also be used to carry other items such as baby toys, baby bottles and a blanket, also not shown.

The strap 14 is fixed to the stroller organizer 10 in any suitable manner, such as by sewing the strap, as shown. The point of attachment 28 of the strap can be at the upper end of the side 30 of the organizer, or any other suitable location on the organizer. The strap is sufficiently long so that the organizer can be conveniently carried with the strap on the shoulder and the organizer held under the arm. The strap is provided with a closure attachment 32, comprised of a pair of mated snaps, a first snap 34 and a second snap 36. The mating snaps 34 and 36 can be snapped together to convert the intermediate portion 38 of the strap into a loop. The loop is indicated at 40 in FIGS. 2 and 3.

Figure 2:
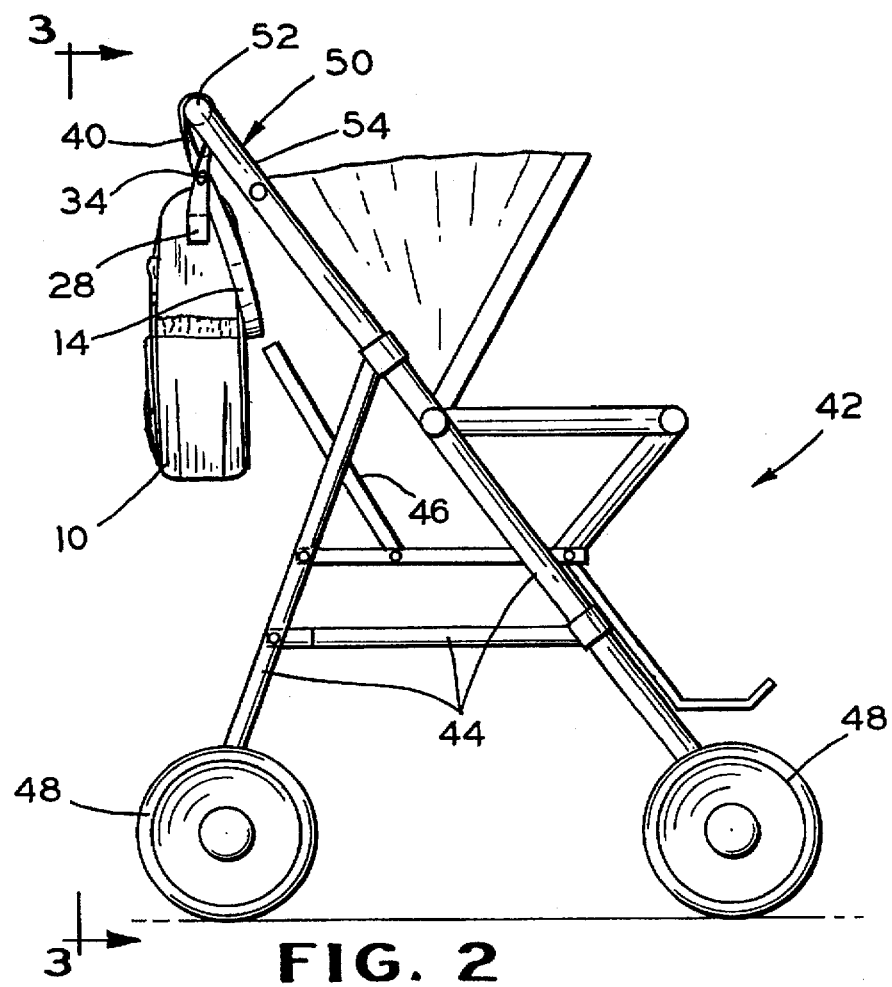
FIG. 2 is a schematic view in elevation of the organizer of FIG. 1 in combination with a stroller.
Figure 3:
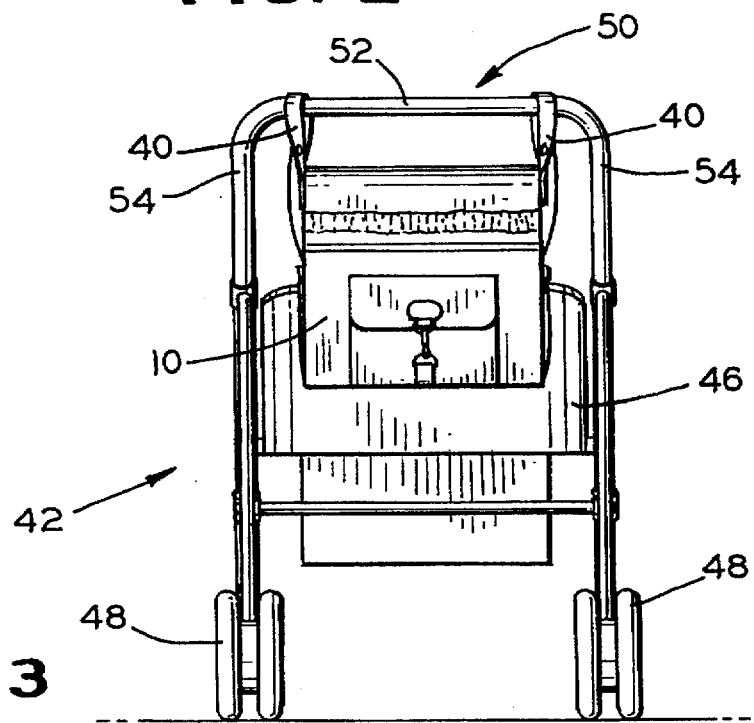
FIG. 3 is a schematic end view in elevation of the organizer and stroller of FIG. 2, taken along line 3—3.

As shown in FIGS. 2 and 3, the stroller 42 is comprised of a frame 44, a seat 46, wheels 48, and a handle 50. The handle is comprised of horizontal bar 52 and downwardly extending side bars 54 which can extend along portions of the frame 44. Many different designs for strollers are being manufactured, and it is to be understood that the stroller need not have all the features shown in the drawings, and can have various features and attributes not shown.

The strap 14 is formed into two loops 40 by the closure attachment. The two loops extend around the horizontal bar 52 so that the organizer is hanging from the horizontal bar. By using the closure attachment 32 (first and second snaps 34 and 36), the strap has been shortened. This is highly advantageous because the organizer is now positioned relatively high up on the stroller, and is not dragging on the ground. An additional benefit in having the organizer higher up away from the ground is that the organizer is relatively easy to reach. Also, by forming the loops 40 around the horizontal bar 52, the strap is prevented from sliding down on the handle side bars 54 and interfering with the seat 46 or the toddler who may be sitting in the seat.

As shown in FIG. 1, the first snap 34 of the closure attachment 32 is separated from the second snap 36 by the length of strap that is in the intermediate portion 38. The length of the intermediate portion 38 is preferably within the range of from about 2 to about 12 inches to form the proper loop size for the loop 40. The desirable length is somewhat dependent on the thickness or diameter of the horizontal bar 52. Also, the first snap 34 is positioned relatively close to the organizer bag so that the loop will be close to the organizer to keep the organizer high up off the ground. Preferably the first snap is positioned on the strap at a distance within the range of from about one-half to about 6 inches from the point of attachment of the strap to the bag so that the loop formed by the snap will be within the range of from about one-half to about 6 inches from the bag. Although loops 40 are shown on both ends of the strap in FIGS. 2 and 3, the strap can be provided with a single closure attachment.

Figures 4, 5:
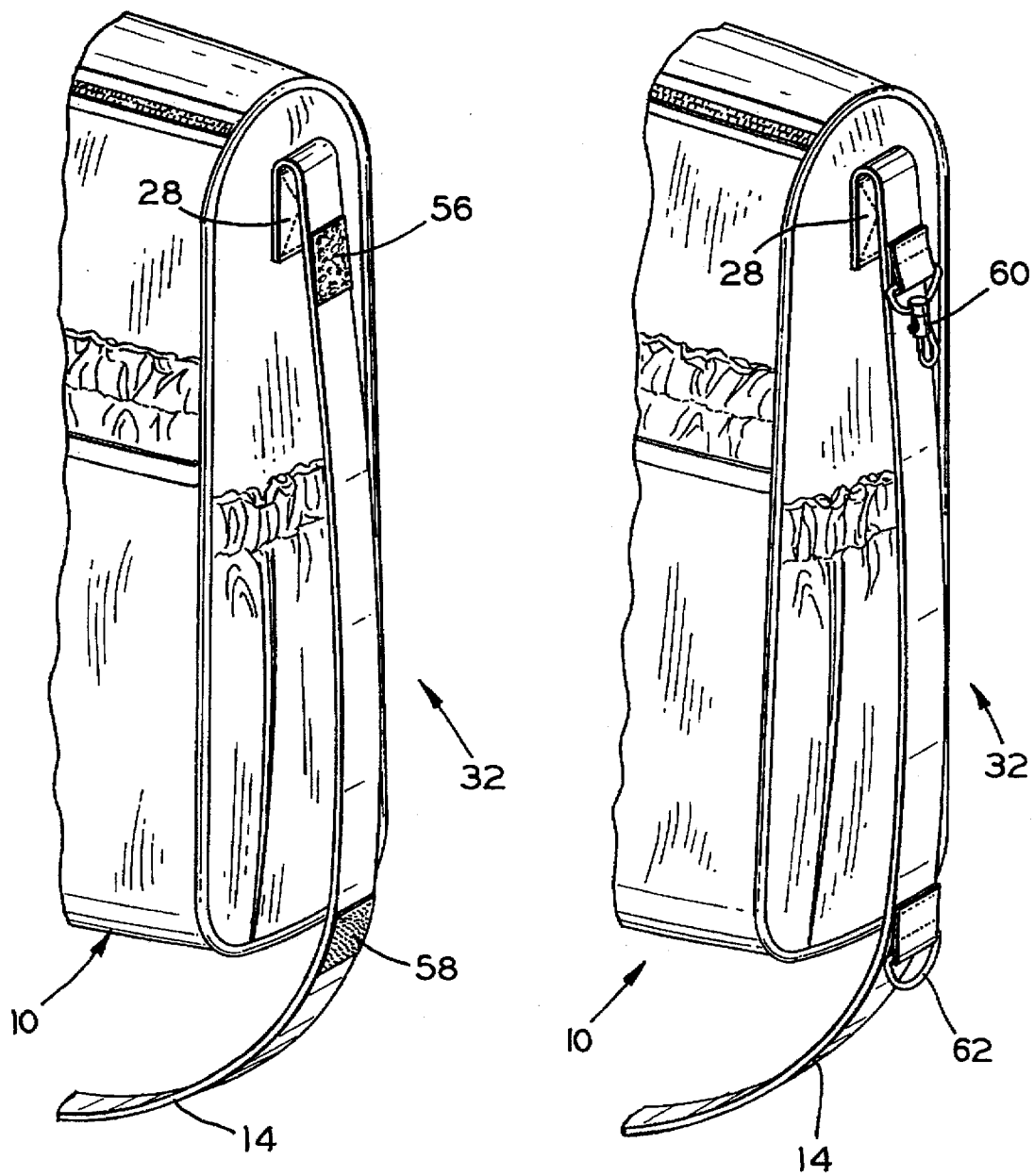
FIG. 4 illustrates an alternative Velcro closure attachment on the strap of the organizer.
FIG. 5 illustrates an alternative hook and ring closure attachment on the strap of the organizer.

It can be seen that a key feature of the closure attachment of the invention is the fact that it can readily and easily be closed or snapped together around the horizontal bar 52 to form the loops. As shown in FIG. 4, the closure attachment 32 need not be a mated pair of snaps, but can be a mated pair of Velcro patches 56 and 58 which can be squeezed together to form the loop for holding the organizer 10 onto a stroller. Also, the closure attachment can be a mated hook 60 and ring 62 for shortening the strap and forming a loop 40, as shown in FIG. 5.

Figure 6:
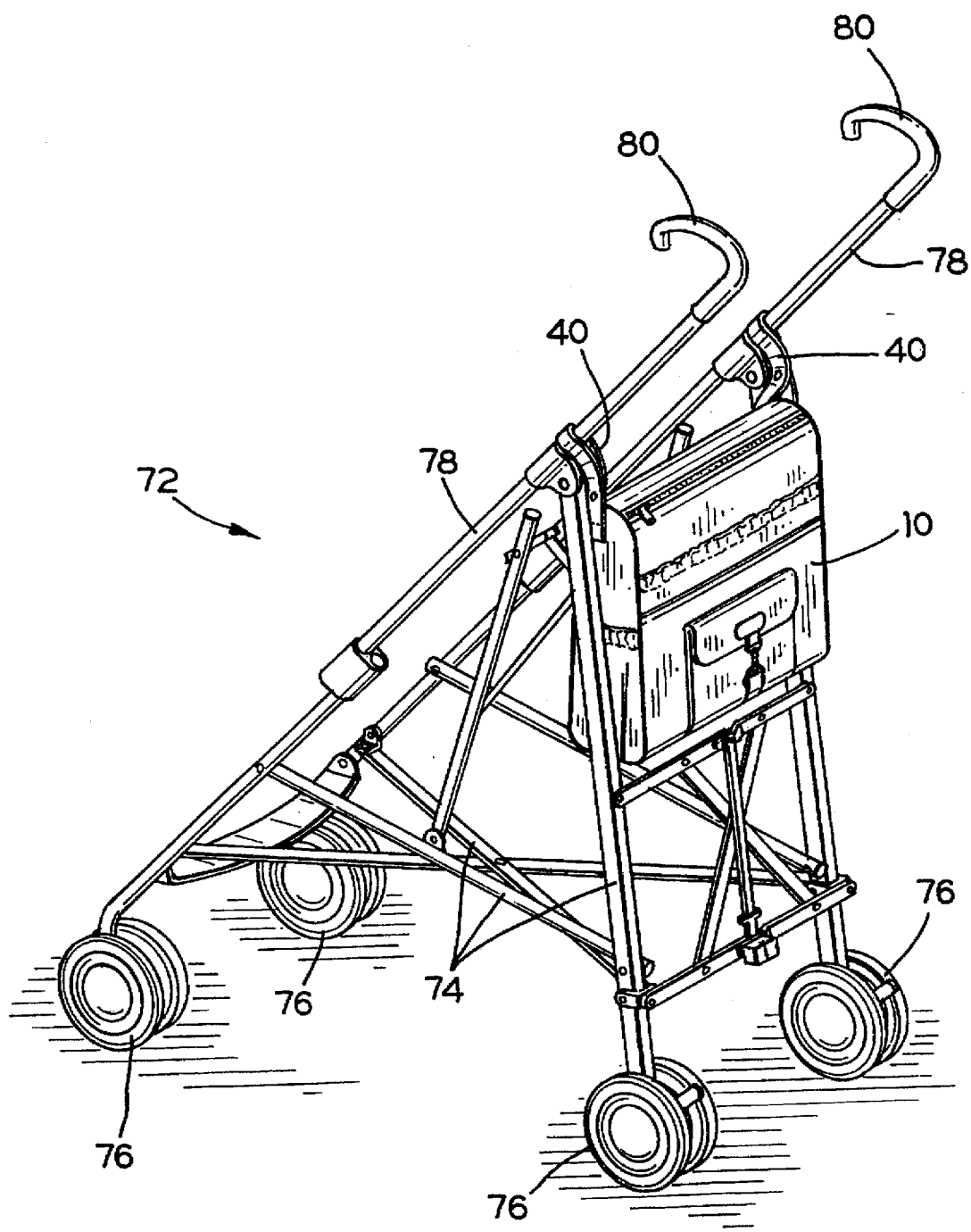
FIG. 6 is a schematic view in perspective of the organizer of FIG. 1 in combination with an umbrella stroller.

The organizer of the invention can be used with an umbrella stroller 72, as shown in FIG. 6. The umbrella stroller has a frame 74, a seat, not shown, wheels 76, and a handle consisting of two downwardly extending side bars 78 and two handle grips 80 and 88. It can be seen that the loops 40 slide partway down the sidebars 78, but still prevent the organizer 10 from riding too low on the stroller.

The principle and mode of operation of this invention have been explained and illustrated in its preferred embodiment. However, it must be understood that this invention may be practiced otherwise than as specifically explained and illustrated without departing from its scope.

What is claimed is:

1. A bag for containing articles, the bag having a single elongated strap secured at each of its ends to the bag, with one end of the strap being secured to one side of the bag and the other end of the strap being secured to the other side of the bag, the single elongated strap being sufficiently long so that the bag can be carried on a shoulder, the bag being capable of being secured to the handle of a stroller, the strap having a closure attachment at each end of the strap so that a loop can be formed at each end of the strap for securing the strap to the stroller handle.

2. The bag of claim 1 in which the closure attachment is a pair of mated snaps for forming the loop.

3. The bag of claim 2 in which the pair of mated snaps includes a first snap and a second snap spaced apart from each other by a distance within the range of from about 2 to about 12 inches.

4. The bag of claim 2 in which the pair of mated snaps includes a first snap positioned on the strap at a distance within the range of from about one-half to about 6 inches from the point of attachment of the strap to the bag so that the loop formed by the snap will be within the range of from about one-half to about 6 inches from the bag.

5. The bag of claim 4 in which the pair of mated snaps includes a second snap spaced apart from the first snap by a distance within the range of from about 2 to about 12 inches.

6. The bag of claim 1 in which the closure attachment is a Velcro attachment for forming the loop.

7. The bag of claim 1 in which the closure attachment is a hook and ring attachment for forming the loop.

8. A bag suitable for containing baby articles, the bag having a single elongated strap secured at each of its ends to the bag, with one end of the strap being secured to one side of the bag and the other end of the strap being secured to the other side of the bag, the single elongated strap being sufficiently long so that the bag can be carried on a shoulder, the bag being capable of being secured to the handle of a stroller, the strap having a closure attachment at each end of the strap so that a loop can be formed at each end of the strap for securing the strap to the stroller handle, where the loops are positioned on the strap at a distance within the range of from about one-half to about 6 inches from the point of attachment of the strap to the bag.

9. The bag of claim 8 in which each closure attachment is a pair of mated snaps for forming the loop.

10. The bag of claim 9 in which the pair of mated snaps includes a first snap and a second snap spaced apart from each other by a distance within the range of from about 2 to about 12 inches.

11. The bag of claim 8 in which each closure attachment is a Velcro attachment for forming the loops.

12. The bag of claim 8 in which each closure attachment is a hook and ring attachment for forming the loops.

13. In combination a stroller having a frame, a seat, wheels and a handle, and a bag for containing articles, the bag having a single elongated strap secured at each of its ends to the bag, with one end of the strap being secured to one side of the bag and the other end of the strap being secured to the other side of the bag, the bag being secured to the handle of a stroller, the strap having two closure attachments at each end of the strap so that a loop is formed at each end of the strap for securing the strap to the stroller handle, where the single elongated strap is sufficiently long so that the bag can be carried on a shoulder when the closure attachments are opened.

14. The combination of claim 13 in which each closure attachment is a pair of mated snaps for forming the loops.

15. The combination of claim 14 in which each pair of mated snaps includes a first snap and a second snap spaced apart from each other by a distance within the range of from about 2 to about 12 inches.

16. The combination of claim 14 in which each pair of mated snaps includes a first snap positioned on the strap at a distance within the range of from about one-half to about 6 inches from the point of attachment of the strap to the bag so that the loop formed by the snap will be within the range of from about one-half to about 6 inches from the bag.

17. The combination of claim 16 in which each pair of mated snaps includes a second snap spaced apart from the first snap by a distance within the range of from about 2 to about 12 inches.

18. The combination of claim 13 in which each closure attachment is pair of mated snaps for forming the loops, where each pair of mated snaps includes a first snap and a second snap spaced apart from each other by a distance within the range of from about 2 to about 12 inches, and where each pair of mated snaps includes a first snap positioned on the strap at a distance within the range of from about one-half to about 6 inches from the point of attachment of the strap to the bag so that the loop formed by the snap will be within the range of from about one-half to about 6 inches from the bag.

19. The combination of claim 13 in which the handle comprises a horizontal bar and left and right downwardly extending side bars, where the loops secure the strap to the horizontal bar.

\* \* \* \* \*